United States Patent
Tsuchiya et al.

(10) Patent No.: US 11,643,075 B2
(45) Date of Patent: May 9, 2023

(54) COLLISION AVOIDANCE ASSIST CONTROL APPARATUS

(71) Applicant: TOYOTA JIDOSHA KABUSHIKI KAISHA, Toyota (JP)

(72) Inventors: Koichi Tsuchiya, Susono (JP); Kazunori Nogi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 17/020,269

(22) Filed: Sep. 14, 2020

(65) Prior Publication Data

US 2021/0171022 A1    Jun. 10, 2021

(30) Foreign Application Priority Data

Dec. 5, 2019   (JP) .............................. JP2019-220266

(51) Int. Cl.
    *B60W 30/09* (2012.01)
    *B60W 30/095* (2012.01)
    *B60W 10/18* (2012.01)
    *B60W 10/20* (2006.01)
    *G06V 20/58* (2022.01)

(52) U.S. Cl.
    CPC ............ *B60W 30/09* (2013.01); *B60W 10/18* (2013.01); *B60W 10/20* (2013.01); *B60W 30/0956* (2013.01); *G06V 20/58* (2022.01); *B60W 2540/106* (2013.01); *B60W 2540/18* (2013.01); *B60W 2554/80* (2020.02)

(58) Field of Classification Search
    CPC ...... B60W 30/09; B60W 10/18; B60W 10/20; B60W 30/0956; B60W 2540/106; B60W 2540/18; B60W 2554/80; B60W 2540/10; B60W 50/12; B60W 2050/146; B60W 10/06; B60W 10/184; B60W 50/10; B60W 50/14; G06V 20/58; G06V 20/56; B60T 7/22
    See application file for complete search history.

(56) References Cited

U.S. PATENT DOCUMENTS 9,105,190 B2   8/2015   Akiyama
9,393,960 B2   7/2016   Kodaira
(Continued)

FOREIGN PATENT DOCUMENTS

JP   2012-121534 A   6/2012
JP   2017-114429 A   6/2017

*Primary Examiner* — Russell Frejd
*Assistant Examiner* — Ana D Thomas
(74) *Attorney, Agent, or Firm* — Sughrue Mion, PLLC (57) ABSTRACT

In a case of a mistaken pedal operation determination: ON, the driving assist ECU sets a value of a steering angle threshold θref to a value θref2 which is greater than a normal value of the steering angle threshold, and sets a value of a steering operation rate threshold ωref to a value ωref2 which is greater than a normal value of the steering operation rate threshold. When a steering angle θ is equal to or greater than the steering angle threshold θref and/or when a steering operation rate ω is equal to or greater than the steering operation rate threshold ωref, the ECU delays a start timing of a automatic brake control, by setting a value of a threshold for executing TTCa to a delaying execution threshold TTCa2 that is smaller than a normal value of the threshold for executing TTCa.

4 Claims, 4 Drawing Sheets

(56) References Cited

U.S. PATENT DOCUMENTS

| | | |
|---|---|---|
| 9,405,727 B2 | 8/2016 | Nagata |
| 9,483,945 B2 | 11/2016 | Okita et al. |
| 9,669,760 B2 | 6/2017 | Hanita et al. |
| 9,873,412 B2 | 1/2018 | Moriizumi |
| 9,898,929 B2 | 2/2018 | Harada et al. |
| 9,965,955 B2 | 5/2018 | Fujishiro |
| 10,793,147 B2 | 10/2020 | Kaminade et al. |
| 10,946,830 B2 | 3/2021 | Sawai et al. |
| 11,175,673 B2 | 11/2021 | Eshima |
| 2012/0179304 A1* | 7/2012 | Tokumochi ........... B60W 50/10 701/1 |
| 2018/0118205 A1* | 5/2018 | Minemura ............ B60W 50/14 |
| 2019/0001970 A1 | 1/2019 | Takahashi et al. |

* cited by examiner

COLLISION AVOIDANCE ASSIST CONTROL APPARATUS

TECHNICAL FIELD

The present disclosure relates to a collision avoidance assist control apparatus configured to perform an automatic brake control so as to avoid a collision between a host vehicle and an obstacle.

BACKGROUND

There has been a known collision avoidance assist control apparatus configured to:
  detect an obstacle having a probability (or high possibility, a high collision possibility) of a collision with a host vehicle, using a forward direction detection sensor such as a camera sensor and a radar sensor; and
  perform an automatic brake control so as to avoid the collision between the host vehicle and the detected obstacle.

The automatic brake control is a control to generate brake force applied to the host vehicle so as to automatically decelerate the host vehicle at a predetermined deceleration without requiring an braking operation (i.e., a driver's operation of a brake pedal, or a brake pedal operation of a driver).

If the automatic brake control is started at an early stage despite the fact that the driver himself/herself has started performing a collision avoidance operation (e.g., steering operation), the automatic brake control may bother the driver. An apparatus (hereinafter, referred to as a conventional apparatus) disclosed in Japanese Patent Application Laid-Open (kokai) No. 2017-114429 is configured to cope with this problem.

More specifically, the conventional apparatus is configured to:
  detect a predetermined driver's steering operation, as the collision avoidance operation performed by the driver, when the automatic brake control is supposed to be carried out (i.e., when there is a high possibility of collision between the host vehicle and the obstacle); and
  delay a start timing of the automatic brake control when the predetermined driver's steering operation is detected, as compared with a case where the predetermined driver's steering operation is not detected.

The thus configured conventional apparatus can prevent the automatic brake control from bothering the driver. Hereinafter, a condition for determining that a certain steering operation by the driver is the collision avoidance operation (namely, a condition for confirming/determining collision avoidance steering operation intention) is referred to as a collision avoidance steering operation intention confirmation condition, that is abbreviated to a "CASOIC condition", hereinafter.

SUMMARY

Meanwhile, there may be a case where the driver mistakenly presses an acceleration pedal immediately after he/she notices the obstacle and intends to press a brake pedal. Such an operation that the driver mistakenly presses/depresses the acceleration pedal instead of the brake pedal despite the driver's intention to press the brake pedal is referred to as a mistaken pedal operation. In the situation where the mistaken pedal operation is being occurred, the driver may further perform a mistaken steering operation. In addition, since the host vehicle is rapidly accelerated when the mistaken pedal operation has occurred, a part of ground load is moved form front wheels to rear wheels, and therefore, the steering wheel can be operated more easily/lightly. For the reasons above, the CASOID condition is easily satisfied, and thus, the start timing of the automatic brake control may be unnecessarily delayed.

For example, an apparatus can determine that the mistaken pedal operation has occurred when a rapid acceleration pressing operation has been detected. This apparatus may be configured in such a manner that it does not delay the start timing of the automatic brake control when it is determined that the mistaken pedal operation has occurred. However, according to the thus configured apparatus, delaying the start timing of the automatic brake control is prohibited even when the driver intends to perform the steering operation to avoid the collision. This may bother the driver, since the automatic brake control is started at an early stage, against the driver's intention.

As understood from the above, there is a room for improving a control for delaying the start timing of the automatic brake control. The control for delaying the start timing of the automatic brake control may be referred to as a "delaying control" or a "delaying control of the automatic brake control", for the purpose of the simplification.

The present disclosure has been made to cope with the problems described above. One of the objectives of the present disclosure is to provide a collision avoidance assist control apparatus that is capable of appropriately performing the delaying control of the automatic brake control.

In some embodiments of the present disclosure, the collision avoidance assist control apparatus comprises:
  a brake device (20, 21, 22) configured to generate brake force applied to a host vehicle in accordance with a brake pedal operation of a driver;
  a surrounding area detection sensor (50, 60) configured to obtain information on an object that is present around the host vehicle; and
  a control unit (10) configured to:
    regard the object as an obstacle when the object is determined to have a certain (predetermined high) probability of an imminent collision between the host vehicle and the object based on the information obtained by the surrounding area detection sensor (11); and
    perform an automatic brake control to let the brake device generate the brake force applied to the host vehicle without requiring the brake pedal operation of the driver so as to avoid the collision (13), when said object is regarded/determined as said obstacle,
  wherein,
  the control unit is configured to:
    determine whether or not a steering operation index value correlated with a steering operation of the driver satisfies a predetermined collision avoidance steering operation intention confirmation condition that is a condition to be satisfied when it can be inferred that the driver has performed a steering operation to avoid the imminent collision between the host vehicle and the obstacle;
    delay a start timing of the automatic brake control when it is determined that the steering operation index value correlated satisfies the collision avoidance steering operation intention confirmation condition (14);

determine whether or not an acceleration operation index value corelated with an acceleration pedal operation of the driver satisfies a predetermined mistaken pedal operation determination condition that is a condition to be satisfied when it can be inferred that the driver has performed a mistaken pedal operation to mistakenly press an acceleration pedal despite the driver's intention to operate a brake pedal (16); and use a first specific condition, as the collision avoidance steering operation intention confirmation condition, when the acceleration operation index value has satisfied the mistaken pedal operation determination condition, and use a second specific condition, as the collision avoidance steering operation intention confirmation condition, when the acceleration operation index value has not satisfied the mistaken pedal operation determination condition, wherein the first specific condition is harder to be satisfied by the steering operation index value than the second specific condition (15, S12, S13).

In the above embodiment, it can be expressed that the collision avoidance assist control apparatus comprises:

a brake device (20, 21, 22) configured to generate brake force applied to a host vehicle in accordance with a brake pedal operation of a driver;

an obstacle detection section (50, 60, 11) configured to detect an obstacle that is present around the host vehicle;

an automatic brake control section (13) configured to perform an automatic brake control to let the brake device generate the brake force applied to the host vehicle without requiring the brake pedal operation of the driver so as to avoid the collision, when there is a high possibility that the host vehicle collides with the obstacle (13); and a delay control section (14) configured to:
determine whether or not a steering operation index value correlated with a steering operation of the driver satisfies a predetermined collision avoidance steering operation intention confirmation condition; and infer that the driver has performed a steering operation to avoid the collision between the host vehicle and the obstacle, when it is determined that the steering operation index value satisfies the collision avoidance steering operation intention confirmation condition; and delay a start timing of the automatic brake control when it is inferred that the driver has performed the steering operation to avoid the collision (14).

The collision avoidance assist control apparatus further comprises a mistaken pedal operation determination section (16) configured to:

determine whether or not an acceleration operation index value corelated with an acceleration pedal operation of the driver satisfies a predetermined mistaken pedal operation determination condition; and infer that the driver has performed a mistaken pedal operation to mistakenly press an acceleration pedal despite the driver's intention to operate a brake pedal when it is determined that the acceleration operation index value satisfies the mistaken pedal operation determination condition.

The collision avoidance assist control apparatus further comprises an intention determination condition switching section (15, S12, S13) configured to switch the collision avoidance steering operation intention confirmation condition between when it is determined that the mistaken pedal operation has not been performed and when it is determined that the mistaken pedal operation has been performed.

Here, the collision avoidance steering operation intention confirmation condition used/set when it is determined that the mistaken pedal operation has been performed is a condition that is harder (more difficult, more unlikely) to be satisfied than the collision avoidance steering operation intention confirmation condition used/set when it is determined that the mistaken pedal operation has not been performed.

In some embodiment, the collision avoidance assist control apparatus comprises the brake device, the obstacle detection section, the automatic brake control section, and the delay control section. The brake device generates the brake force applied to the host vehicle (e.g., a torque to stop the rotation of each of wheels of the host vehicle) in accordance with (in response to) the brake pedal operation of the driver. For instance, the brake device uses a brake oil pressure to generate the brake force that varies depending on the brake pedal operation.

The obstacle detection section detects an obstacle that is present around (near, in the vicinity of) the host vehicle.

The automatic brake control section performs the automatic brake control to let the brake device generate the brake force applied to the host vehicle without requiring the brake pedal operation of the driver so as to avoid the collision between the host vehicle and the obstacle, when the automatic brake control section determines that there is a high possibility that the host vehicle collides with the obstacle.

The delay control section is configured to:
determine whether or not the steering operation index value correlated with the steering operation of the driver satisfies a predetermined collision avoidance steering operation intention confirmation condition (CASOIC condition); and infer that the driver has performed the steering operation to avoid the collision between the host vehicle and the obstacle, when it is determined that the steering operation index value satisfies the CASOIC condition; and delay the start timing of the automatic brake control when it is inferred that the driver has performed the steering operation to avoid the collision.

The control for delaying the start timing of the automatic brake control, that is executed by the delay control section, may sometimes referred to as a delaying control.

The steering operation index value may include a steering operation amount (e.g., a steering angle) and a steering operation rate (e.g., a steering operation rate that is a change amount in the steering angle per unit time).

The collision avoidance steering operation intention confirmation condition (CASOIC condition) has been determined as a condition that is satisfied when it can be determined that the driver has performed the steering operation to avoid the collision between the host vehicle and the obstacle. Such a steering operation may be referred to as a collision avoidance steering operation. Thus, when it is inferred/determined that the driver has performed the collision avoidance steering operation, the CASOIC condition is satisfied, and consequently, the start timing of the automatic brake control is delayed. Accordingly, it may be possible to prevent the automatic brake control from bothering the driver.

The acceleration pedal operation is not necessarily performed in accordance with the driver's intention. For instance, the driver may strongly press the acceleration pedal brake despite his/her intention to press the brake pedal, when he/she notices the obstacle immediately ahead of the host vehicle.

In view of the above, the collision avoidance assist control apparatus in some embodiments includes the mistaken pedal operation determination section. The mistaken pedal operation determination section determines whether or not the acceleration operation index value corelated with the acceleration pedal operation of the driver satisfies the predetermined mistaken pedal operation determination condition, and infers that the driver has performed the mistaken pedal operation to mistakenly press the acceleration pedal despite the driver's intention to operate the brake pedal when it is determined that the acceleration operation index value satisfies the mistaken pedal operation determination condition. The acceleration operation index value may include the acceleration pedal operation amount and the acceleration pedal operation rate that is a change amount in the acceleration pedal operation amount per unit time. For instance, the rapid pressing operation of the acceleration pedal may be regarded as the mistaken pedal operation.

When the mistaken pedal operation is performed, the driver may further perform a mistaken steering operation. In addition, since the host vehicle is rapidly accelerated when the mistaken pedal operation has occurred, a part of ground load is moved form front wheels to rear wheels, and therefore, the steering wheel can be operated more easily/lightly. For the reasons above, the collision avoidance steering operation intention confirmation condition (CASOIC condition) is easily satisfied, and thus, the start timing of the automatic brake control may be unnecessarily delayed.

As understood, when it is inferred that the mistaken pedal operation has been occurring, reliability in determining whether the CASOIC condition is satisfied is lowered. In view of this, the intention determination condition switching section switches the collision avoidance steering operation intention confirmation condition between when it is determined/inferred that the mistaken pedal operation has not been performed and when it is determined/inferred that the mistaken pedal operation has been performed. More specifically, the collision avoidance steering operation intention confirmation condition used/set when it is determined/inferred that the mistaken pedal operation has been performed is a condition that is harder (more difficult, more unlikely) to be satisfied than the collision avoidance steering operation intention confirmation condition used/set when it is determined/inferred that the mistaken pedal operation has not been performed.

Accordingly, the collision avoidance assist control apparatus in some embodiments of the present disclosure can appropriately perform the delaying control of the automatic brake control, even when it is determined/inferred that the mistaken pedal operation has been performed.

In some embodiments, the control unit is configured to:
  obtain a steering angle as the steering operation index value; and
  determine that the steering operation index value has satisfied the first specific condition in at least a case where the steering angle is equal to or greater than a first steering angle threshold that is greater than a second steering angle threshold; and
  determine that the steering operation index value has satisfied the second specific condition in at least a case where the steering angle is equal to or greater than the second steering angle threshold.

In other words, in some embodiments, the delay control section is configured to obtain a steering angle as the steering operation index value; and to determine that the steering operation index value has satisfied the CASOIC condition in at least a case where the steering angle is equal to or greater than a steering angle threshold (S14, S16).

The intention determination condition switching section switches the steering angle threshold in such a manner that a value of the steering angle threshold used when it is determined/inferred that the mistaken pedal operation has been performed is greater than a value of the steering angle threshold used when it is determined/inferred that the mistaken pedal operation has not been performed (S13).

According to the thus configured apparatus, at least when the steering angle is equal to or greater than the steering angle threshold, it is determined that the steering operation index value satisfies the CASOIC condition, and the start of the automatic brake control is delayed. The value of the steering angle threshold used when it is determined/inferred that the mistaken pedal operation has been performed is set to be a value greater than the value of the steering angle threshold used when it is determined/inferred that the mistaken pedal operation has not been performed.

The reliability of the inference regarding the mistaken pedal operation is higher, as the steering angle is greater. Therefore, according to the above embodiment, the start timing of the automatic brake control is delayed when a possibility that the driver has performed the collision avoidance steering operation is higher in the case where it is inferred that the mistaken pedal operation has been occurring. Thus, the delaying control of the automatic brake control can be appropriately performed, even when it is determined/inferred that the mistaken pedal operation has been performed.

In some embodiments, the control unit is configured to:
  obtain a steering operation rate as the steering operation index value; and
  determine that the steering operation index value has satisfied the first specific condition in at least a case where the steering operation rate is equal to or greater than a first steering operation rate threshold that is greater than a second steering operation rate threshold; and
  determine that the steering operation index value has satisfied the second specific condition in at least a case where the steering operation rate is equal to or greater than the second steering operation rate threshold.

In other words, in some embodiments, the delay control section is configured to obtain a steering operation rate as the steering operation index value; and to determine that the steering operation index value has satisfied the CASOIC condition in at least a case where the steering operation rate is equal to or greater than a steering operation rate threshold (S14, S16).

The intention determination condition switching section switches the steering operation rate threshold in such a manner that a value of the steering operation rate threshold used when it is determined/inferred that the mistaken pedal operation has been performed is greater than a value of the steering operation rate threshold used when it is determined/inferred that the mistaken pedal operation has not been performed (S13).

According to the thus configured apparatus, at least when the steering operation rate is equal to or greater than the steering operation rate threshold, it is determined that the steering operation index value satisfies the CASOIC condition, and the start of the automatic brake control is delayed. The value of the steering operation rate threshold used when it is determined/inferred that the mistaken pedal operation has been performed is set to be a value greater than the value of the steering operation rate threshold used when it is determined/inferred that the mistaken pedal operation has not been performed.

The reliability of the inference regarding the mistaken pedal operation is higher, as the steering operation rate is greater. Therefore, according to the above embodiment, the start timing of the automatic brake control is delayed when a possibility that the driver has performed the collision avoidance steering operation is higher in the case where it is inferred that the mistaken pedal operation has been occurring. Thus, the delaying control of the automatic brake control can be appropriately performed, even when it is determined/inferred that the mistaken pedal operation has been performed.

In some embodiments, the control unit is configured to:
obtain each of a steering angle and a steering operation rate, as the steering operation index value; and
determine that the steering operation index value has satisfied the first specific condition, in a case where the steering angle is equal to or greater than a first steering angle threshold that is greater than a second steering angle threshold and/or in a case where the steering operation rate is equal to or greater than a first steering operation rate threshold that is greater than a second steering operation rate threshold; and
determine that the steering operation index value has satisfied the second specific condition in a case where the steering angle is equal to or greater than the second steering angle threshold and/or in a case where the steering operation rate is equal to or greater than the second steering operation rate threshold.

In other words, in some embodiments, the delay control section is configured to obtain, as the steering operation index value, a steering angle and a steering operation rate and to determine that the steering operation index value has satisfied the CASOIC condition in a case where the steering angle is equal to or greater than a steering angle threshold and/or in a case where the steering operation rate is equal to or greater than a steering operation rate (S14, S16).

The intention determination condition switching section switches the steering angle threshold in such a manner that a value of the steering angle threshold used when it is determined/inferred that the mistaken pedal operation has been performed is greater than a value of the steering angle threshold used when it is determined/inferred that the mistaken pedal operation has not been performed and in such a manner that a value of the steering operation rate threshold used when it is determined/inferred that the mistaken pedal operation has been performed is greater than a value of the steering operation rate threshold used when it is determined/inferred that the mistaken pedal operation has not been performed (S13).

According to the thus configured apparatus, when the steering angle is equal to or greater than the steering angle threshold and/or when the steering operation rate is equal to or greater than the steering operation rate threshold, it is determined that the steering operation index value satisfies the CASOIC condition, and the start of the automatic brake control is delayed. The value of the steering angle threshold used when it is determined/inferred that the mistaken pedal operation has been performed is set to be a value greater than the value of the steering angle threshold used when it is determined/inferred that the mistaken pedal operation has not been performed. In addition, the value of the steering operation rate threshold used when it is determined/inferred that the mistaken pedal operation has been performed is set to be a value greater than the value of the steering operation rate threshold used when it is determined/inferred that the mistaken pedal operation has not been performed.

The reliability of the inference regarding the mistaken pedal operation is higher, as the steering angle and the steering operation rate are greater. Therefore, according to the above embodiment, the start timing of the automatic brake control is delayed when a possibility that the driver has performed the collision avoidance steering operation is higher in the case where it is inferred that the mistaken pedal operation has been occurring. Thus, the delaying control of the automatic brake control can be appropriately performed, even when it is determined/inferred that the mistaken pedal operation has been performed.

In some embodiments, the control unit is configured to:
perform the automatic brake control when a time to collision that is a predicted time length from a present time point to a collision time point of the imminent collision between the host vehicle and the obstacle decreases down to a value equal to or smaller than an execution threshold (S17, S18, S19); and
decrease the execution threshold so as to delay the start timing of the automatic brake control.

In other words, in some embodiments, the automatic brake control section is configured to perform the automatic brake control when the time to collision (TTC) decreases down to an execution threshold (TTCa) (S17, S18, S19).

The delay control section is configured to delay the start timing of the automatic brake control by setting the execution threshold (TTCa) of when it delays the start timing of the automatic brake control to a value (TTCa2) that is smaller than a value (TTCa1) of when it does not delay the start timing of the automatic brake control (S18).

In some embodiments, the automatic brake control section performs the automatic brake control when the time to collision (TTC) becomes smaller than the execution threshold. Therefore, adjusting the execution threshold can change the start timing of the automatic brake control. For instance, when the execution threshold is set to a large value, the automatic brake control can be started at an early timing. Whereas, when the execution threshold is set to a small value, the automatic brake control can be started at a late timing.

The delay control section sets the execution threshold of when it delays the start timing of the automatic brake control to the value that is smaller than the value of when it does not delay the start timing of the automatic brake control. Therefore, the start timing of the automatic brake control is easily and certainly delayed.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure are not limited to those in the embodiments defined by the names and/or the symbols. Other objects, other features, and attendant advantages of the present disclosure will be readily appreciated from the following description of the embodiments of the disclosure which is made with reference to the accompanying drawings.

DETAILED DESCRIPTION

A collision avoidance assist control apparatus (hereinafter, sometimes referred to as a "present apparatus") according to an embodiment of the present disclosure will be described with reference to the drawings.

Figure 1:
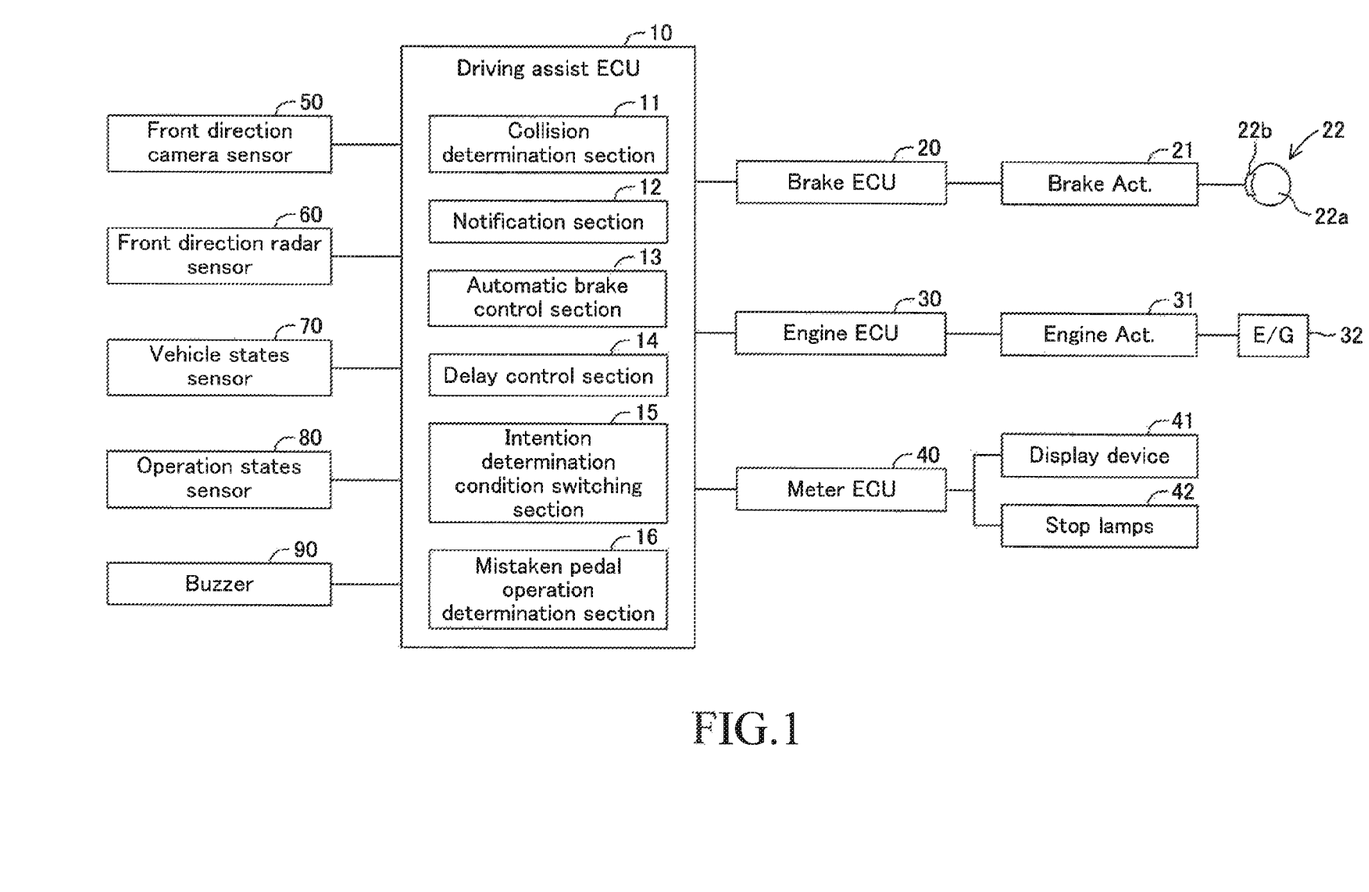
FIG. 1 is a schematic diagram of a collision avoidance assist control apparatus according to an embodiment of the present disclosure.

The present apparatus is applied to a vehicle that is sometimes referred to as a "host vehicle" in order to be distinguished from other vehicles. As shown in FIG. 1, the present apparatus comprises a driving assist ECU 10, a brake ECU 20, an engine ECU 30, and a meter ECU 40.

The ECUs are Electronic Control Units. The ECUs are connected with each other through a CAN (Controller Area Network) so that one of the ECUs can transmit information to and receive information from the other any one of the ECUs. Each of the ECUs comprises, as a main component, a microcomputer that includes a CPU, a ROM, a RAM, a nonvolatile memory, and an interface I/F. The CPU achieves various functions through executing instructions (i.e., programs/routines) stored in the ROM. Some or all of those ECUs may be integrated into a single ECU.

The driving assist ECU 10 is a main control device to perform driving assist controls (or driver assist controls to assist a driver of the host vehicle to drive the host vehicle), and is configured to perform/execute a collision avoidance assist control as one of the driving assist controls.

The collision avoidance assist control is a control to:

alert the driver when an obstacle ahead of the host vehicle is detected, the obstacle being an object having a probability (high collision possibility) of an imminent collision between the host vehicle and the object; and perform an automatic brake control when the collision possibility becomes higher as compared to the collision possibility of when the alert is started, so as to avoid the collision.

The collision avoidance assist control is generally called a "PCS control (pre-crash safety control)", and thus, hereinafter is sometimes referred to as the "PCS control".

The driving assist ECU 10 is connected with a front direction (forward area) camera sensor 50, a front direction (forward area) radar sensor 60, a vehicle states sensor 70, an operation states sensor 80, and a buzzer 90.

The front direction camera sensor 50 is arranged at an upper part of a front windshield and inside a cabin of the host vehicle, and is configured to take/capture an image (or image data, or a picture) of a scene/area in front of (or ahead of) the host vehicle. The front direction camera sensor 50 is configured to recognize a road marking line such as a white line (or a yellow line) on the road as well as a three dimensional object (or a 3D object) that is present in front of the host vehicle, based on the captured image, and to provide/transmit information on them (i.e., white line information, and 3D object information) to the driving assist ECU 10, every time a predetermined time elapses. The while line information includes information indicative of a shape (e.g., a curvature) of the white line (or the road marking line), and information indicative of a relative positional relationship between the white line and the host vehicle (in a road/lane width direction). The 3D object information includes information indicative of a type and a size of the detected 3D object that is present ahead of the vehicle, and information indicative of a relative positional relationship between the 3D object and the host vehicle. The type of the 3D object may be specified based on a machine learning or the like, including a patter matching method.

The front direction radar sensor 60 is arranged at a center of a front end of a vehicle body of the host vehicle, and is configured to detect a 3D object that is present ahead (in front) of the host vehicle. More specifically, the front direction radar sensor 60 is configured to emit a radar wave (i.e., electrical wave, and referred to as a "millimeter wave") in a millimeter wave band. The 3D object (e.g., an other vehicle, a pedestrian, a bicycle, a building, or the like) that is present within a wave emitted area reflects the emitted millimeter wave. The front direction radar sensor 60 is configured to receive the reflected millimeter wave. The front direction radar sensor 60 is configured to, based on a phase difference between the emitted millimeter wave and the received millimeter wave, a time difference from a time point at which the millimeter wave is emitted to a time point at which the reflected millimeter wave is received, an attenuation rate of the received millimeter wave with respect to the emitted millimeter wave, and the like, obtain a 3D object information (or radar information). The 3D object information includes a distance between the 3D object and the host vehicle, a relative speed of the 3D object with respect to the host vehicle, a relative position (or direction) of the 3D object with respect to the host vehicle. The front direction radar sensor 60 is configured to transmit the 3D object information to the driving assist ECU 10 every time a predetermined time elapses.

The driving assist ECU 10 synthesizes the 3D object information transmitted from the front direction camera sensor 50 and the 3D object information transmitted from the front direction radar sensor 60, so as to obtain more accurate 3D object information.

Hereinafter, the front direction camera sensor 50 and the front direction radar sensor 60 may sometimes be collectively referred to as a "front direction sensor" or a "peripheral/surrounding area detection sensor". It can be said that the peripheral/surrounding area detection sensor is configured to obtain/acquire information on an 3D object that is present around (in the vicinity of) the host vehicle. The 3D object information obtained through the front direction camera sensor 50 and the 3D object information obtained through the front direction radar sensor 60 may sometimes be collectively referred to as "front direction sensor information".

The vehicle states sensor 70 is configured to detect vehicle states (running states) of the host vehicle, and includes, for example, a vehicle speed sensor configured to detect/measure a vehicle speed of the host vehicle, a longitudinal acceleration sensor configured to detect an acceleration of the host vehicle in a front-rear direction, a lateral acceleration sensor configured to detect an acceleration of the host vehicle in a lateral (left-right) direction, and a yaw rate sensor configured to detect a yaw rate of the host vehicle.

The driving operation states sensor 80 is configured to detect driving operation states of the host vehicle performed by the driver of the host vehicle. The driving operation states sensor 80 includes sensors and switches. More specifically, the driving operation states sensor 80 includes an acceleration operation amount sensor configured to detect an operation amount of an acceleration pedal, a brake operation amount sensor configured to detect an operation amount of a brake pedal, a brake switch configured to detect presence or absence of an operation to the brake pedal, a steering angle sensor configured to detect a steering angle that is a steering operation amount, a steering torque sensor configured to detect a steering torque, a turn signal switch (blinker switch) configured to detect an operating state of turn signals, and a shift position sensor configured to detect a shift lever position for a transmission.

The information obtained by the vehicle states sensor 70 and the driving operation states sensor 80 is referred to as sensor information, and is transmitted to the driving assist ECU 10 every time a predetermined time elapses.

The buzzer 90 is configured to generate sound in response to an instruction (activation instruction). The driving assist ECU 10 is configured to transmit the activation instruction to the buzzer 90 to let the buzzer 90 generate the sound, when the driving assist ECU 10 alerts the driver. This can alert the driver so as to call (draw) the driver's attention.

The brake ECU 20 is connected to a brake actuator 21. The brake actuator 21 is provided in an unillustrated hydraulic circuit between an unillustrated master cylinder and a friction brake mechanism 22 of each of wheels. The master cylinder pressurizes brake (working) fluid according to a brake pedal pressing force. The friction brake mechanism 22 comprises a brake disc 22a fixed to each of the wheels, and a brake caliper 22b fixed to the vehicle body. The brake actuator 21 is configured to vary/adjust oil pressure of the brake fluid applied to an unillustrated wheel cylinder in the brake caliper 22b in response to an instruction transmitted from the brake ECU 20. The wheel cylinder is operated by the oil pressure to press an unillustrated brake pad against the brake disc 22a so as to generate a frictional brake force.

The brake ECU 20 is configured to determine a driver request deceleration (or target driver requiring deceleration) based on the operation amount of the brake pedal detected by the brake operation amount sensor, and to control the brake actuator 21 in such a manner that the host vehicle decelerates at the driver request deceleration. Furthermore, the brake ECU 20 is configured to control the brake actuator 21 in such a manner that the host vehicle decelerates at a PCS request deceleration (or target PCS requiring deceleration), when the brake ECU 20 has received a "PCS brake instruction that contains the PCS request deceleration" transmitted from the driving assist ECU 10.

It should be noted that, when the brake pedal is operated/pressed while the brake ECU 20 has been receiving the PCS brake instruction, the brake ECU 20 adopts/employs, as a final requiring deceleration (or final target deceleration), one of the driver request deceleration and the PCS request deceleration, whichever its absolute value is greater. Namely, if the absolute value (magnitude) of the driver request deceleration is greater than the absolute value (magnitude) of the PCS request deceleration, the driver request deceleration is selected as the final requiring deceleration. Whereas, the absolute value (magnitude) of the PCS request deceleration is greater than the absolute value (magnitude) of the driver request deceleration, the PCS request deceleration is selected as the final requiring deceleration. The brake ECU 20 is configured to control the brake actuator 21 in such a manner that the host vehicle decelerates at the final requiring deceleration. In other words, the brake ECU 20 is configured to perform a so-called brake override control.

The engine ECU 30 is connected to an engine actuator 31. The engine actuator 31 is an actuator for changing an operation state of an internal combustion engine 32, and includes a throttle valve actuator for changing an opening degree of the throttle valve. The engine ECU 30 is configured to determine a driver requiring torque, and to control the engine actuator 31 in such a manner that the engine 32 outputs a torque equal to the driver requiring torque.

When the engine ECU 30 has received a driving force restriction instruction transmitted from the driving assist ECU 10, the engine ECU 30 controls the engine actuator 31 so as to impose a limitation on the torque generated/output by the engine 32. It should be noted that the engine actuator 31 may be a driving device for an electric motor, when the host vehicle is an electric vehicle. When the host vehicle is a hybrid vehicle, the engine actuator 31 may include the engine actuator 31 described above and the driving device for an electric motor.

The meter ECU 40 is connected with a display (or a display device) 41 and stop lamps 42. The meter ECU 40 is configured to display various information relating to driving assists on the display 41 in response to instructions transmitted from the driving assist ECU 10. The meter ECU 40 is configured to turn on the stop lamps in response to an instruction from the brake ECU 20 or from the driving assist ECU 10.

<PCS Control>

The PCS control will next be described. The driving assist ECU 10 comprises a collision determination section 11, a notification section (alerting section) 12, an automatic brake control section 13, a delay control section 14, an intention determination condition switching section 15, and a mistaken pedal operation determination section 16, in terms of its functions.

<Collision Determination Section>

The collision determination section 11 determines whether or not the host vehicle is likely to collide with an 3D object that is present in front of (ahead of) the host vehicle, based on the front direction sensor information provided by the front direction sensor and the vehicle states detected by the vehicle states sensor 70. More specifically, the collision determination section 11 determines whether or not there is a probability (high possibility) that the host vehicle collides with the 3D obstacle, under the assumption that the host vehicle keeps its current running (traveling) state and the 3D object keeps its moving state (that may be a stopped state when the 3D object is a stationary object). The collision determination section 11 determines/regards the 3D object as an obstacle, when the collision determination section 11 determines that there is the probability of collision between the host vehicle and the 3D object. In this manner, it is said that the collision determination section 11 detects/recognizes the obstacle.

When the collision determination section 11 has detected/recognized the obstacle, the section 11 calculates (obtains through calculation) a time to collision TTC that is a predicted time length from a present time point to a collision time point of the collision between the host vehicle and the obstacle. The time to collision TTC is calculated based on the following equation (1) using a distance d between the host vehicle and the obstacle, and a relative speed Vr of the obstacle with respect to the host vehicle.

$$TTC = d/Vr \tag{1}$$

The time to collision TTC is used as an index value that is indicative of (or correlated with) a possibility (degree, likelihood) that the host vehicle collides with the obstacle (or indicative of imminency of the collision). The possibility that the host vehicle collides with the obstacle (i.e. the possibility of the collision) is higher as the time to collision TTC is smaller/shorter.

In the PCS control according to the present embodiment, the possibility of the collision is classified into two stages/ levels (i.e., a first stage and a second stage) based on the time to collision TTC. In the first (initial) stage, the notification section 12 alerts the driver with the buzzer 90 and the display 41. In the second stage where the possibility of the collision is higher as compared to the first stage, the automatic brake control section 13 performs the automatic brake control so as to carry out the collision avoidance assist.

More specifically, the collision determination section 11 determines that the possibility of the collision between the host vehicle and the obstacle has reached the first stage, when the time to collision TTC has decreased to a threshold for alerting TTCw. The collision determination section 11 determines that the possibility of the collision between the host vehicle and the obstacle has reached the second stage, when the time to collision TTC has further decreased to a threshold for executing TTCa that is shorter/smaller than the threshold for alerting TTCw (i.e., TTCa<TTCw). The threshold for executing TTCa may be referred to as the execution threshold TTCa.

One of two values are used as the execution threshold TTCa. One of them is for a case to delay the start timing of the automatic brake control, and the other is for a case not to delay the start timing of the automatic brake control. The delay control section 14 determines which value of them is used as the execution threshold TTCa. The execution threshold TTCa having the value for the case not to delay the start timing of the automatic brake control is referred to as a normal execution threshold TTCa1. The execution threshold TTCa having the value for the case to delay the start timing of the automatic brake control is referred to as a delaying execution threshold TTCa2. Each of the normal execution threshold TTCa1 and the delaying execution threshold TTCa2 is simply referred to as the execution threshold TTCa, when it is not necessary to distinguish the TTCa1 and the TTCa2 from each other.

The delaying execution threshold TTCa2 is set at a value smaller than the normal execution threshold TTCa1.

<Automatic Brake Control Section>

The automatic brake control section 13 transmits the PCS brake instruction, when it is determined that the possibility of the collision between the host vehicle and the obstacle has reached the second stage. The PCS brake instruction contains the information indicative of the PCS request deceleration Gpcs.

The brake ECU 20 controls the brake actuator 21 in such a manner that an actual deceleration comes equal to the PCS request deceleration (or target PCS requiring deceleration), when the brake ECU 20 has received the "PCS brake instruction. This generates the frictional brake force applied to each of the wheels so as to decelerate the host vehicle enforcedly without requiring the driver's brake pedal operation.

The above described control to generate the frictional brake force in each of the wheels in response to the PCS brake instruction so as to decelerate the host vehicle is the automatic brake control.

After the automatic brake control section 13 has started the automatic brake control. the section 13 monitors (continuously determines) whether or not the time to collision TTC has become greater than an end threshold TTCb (TTC>TTCb). The end threshold TTCb has been set at a value greater than the threshold for executing TTCa (TTCb>TTCa). Therefore, it can be said that the automatic brake control section 13 monitors (continuously determines) whether or not the possibility of the collision between the host vehicle and the obstacle becomes sufficiently low (in other words, whether or not the collision has been avoided).

When the automatic brake control section 13 determines that the possibility of the collision between the host vehicle and the obstacle becomes sufficiently low, the section 13 stops transmitting the PCS brake instruction. This stops/ends the automatic brake control and the PCS control simultaneously.

Furthermore, the automatic brake control section 13 stops transmitting the PCS brake instruction when the host vehicle has stopped owing to the automatic brake control. This stops/ends the automatic brake control. It should be noted that the automatic brake control section 13 transmits, to the brake ECU 20, a stop-state-hold instruction for a predetermined time (e.g. 2 seconds) after the host vehicle has stopped. In a period in which the brake ECU 20 receives the stop-state-hold instruction, the brake ECU 20 controls the brake actuator 21 to apply an oil pressure set for a stop-state-hold to the wheel cylinder in the friction brake mechanism 22 in each of the wheels. This keeps a stop state of the host vehicle (or keep the host vehicle in the stopped state) for the predetermined time. The PCS control ends after the stop state of the host vehicle is kept for the predetermined time. In addition, in the period in which the brake ECU 20 is executing the automatic brake control and is keeping the stop state of the host vehicle, the brake ECU 20 transmits a lighting instruction of the stop lamps to the meter ECU 40, so as to light the stop lamps.

In the period in which the automatic brake control section 13 is executing the automatic brake control and/or is keeping the stop state of the host vehicle, the automatic brake control section 13 transmits, to the engine ECU 30, the driving force restriction instruction for restricting the torque (or the engine output torque) generated by the engine 32 (e.g., for setting the engine output torque to zero). Therefore, the driver requiring torque is ignored even if the driver operates the acceleration pedal, while the automatic brake control is being executed. Thus, the host vehicle does not accelerate in response to the acceleration pedal operation (or the acceleration operation), while the automatic brake control is being executed.

Meanwhile, there may be a case where the driver operates the steering operation (i.e. steers the host vehicle) by himself/herself to try to avoid the collision. The driver's steering operation with his/her intention to avoid the collision between the host vehicle and the obstacle is referred to as a collision avoidance steering operation. If the automatic brake control is started at an early stage despite the fact that the driver is performing the collision avoidance steering operation, the automatic brake control may bother the driver.

<Delay Control Section>

In view of the above, the delay control section 14 delays the start timing of the automatic brake control, when the collision avoidance steering operation of the driver is detected. The delay control section 14 determines whether or not the collision avoidance steering operation intention confirmation/determination condition (CASOIC condition) is satisfied. The delay control section 14 determines/infers/speculates that the collision avoidance steering operation of the driver has occurred/performed, when the CASOIC condition is (determined to be) satisfied. The CASOIC condition is satisfied when at least one of the following determining conditions W1, and W2 is satisfied.

Condition W1: To be satisfied when (a magnitude of) the steering angle $\theta$ is equal to or greater than a steering angle threshold $\theta$ref (i.e., $\theta \geq \theta$ref).

Condition W2: To be satisfied when (a magnitude of) a steering operation rate $\omega$ ($=d\alpha/dt$) is equal to or greater than a steering operation rate threshold $\omega$ref (i.e., $\omega \geq \omega$ref).

The steering operation amount θ above is the magnitude of an actual steering angle detected by the steering angle sensor at a present time point. In other words, the steering operation amount θ used in the above determination becomes greater as the steering wheel is rotated more from its neutral position regardless of a rotation direction (clockwise or counterclockwise) of the steering wheel. The steering operation rate ω used in the determination is the magnitude (or the absolute value) of a change amount in the steering operation amount θ used in the above determination per unit time. The steering operation amount θ and the steering operation rate ω, both used in the determination, are steering operation index values indicative of (correlated with, relating to) the driver's steering operation.

When the CASOIC condition is not satisfied (namely, when the delay control section 14 does not determine/infer that the collision avoidance steering operation of the driver has occurred/performed), the section 14 sets the value of the execution threshold TTCa to the normal execution threshold TTCa1 (i.e., TTCa←TTCa1). Whereas, when the CASOIC condition is satisfied (namely, when the delay control section 14 determines/infers that the collision avoidance steering operation of the driver has occurred/performed), the section 14 sets the value of the execution threshold TTCa to the delaying execution threshold TTCa2 (i.e., TTCa←TTCa2).

The delaying execution threshold TTCa2 is (has been) set at a value smaller than the normal execution threshold TTCa1. Accordingly, the start timing of the automatic brake control is delayed when the value of the execution threshold TTCa is set at the delaying execution threshold TTCa2, as compared to when the value of the execution threshold TTCa is set at the normal execution threshold TTCa1.

Meanwhile, as mentioned, there may be a case where the driver mistakenly presses the acceleration pedal, when he/she intends to press the brake pedal immediately after he/she has noticed the obstacle. Such an operation that the driver mistakenly presses/depresses the acceleration pedal instead of the brake pedal despite the driver's intention to press the brake pedal is referred to as the mistaken pedal operation. In the situation where the mistaken pedal operation is being occurred, the driver may further perform the mistaken steering operation. In addition, since the host vehicle is rapidly accelerated when the mistaken pedal operation has occurred, a part of ground load is moved form the front wheels that are steered wheels to the rear wheels, and therefore, the steering wheel can be operated more easily/lightly. For the reasons above, the CASOIC condition is easily satisfied, and thus, there may be a case where the start timing of the automatic brake control is unnecessarily delayed.

In other words, when it is inferred that the mistaken pedal operation has been occurring, reliability in determining whether the CASOIC condition is satisfied is lowered (i.e., a possibility that the CASOIC condition is mistakenly/erroneously determined to be satisfied is relatively high).

In view of the above, the driving assist ECU 10 includes the mistaken pedal operation determination section 16 and the intention determination condition switching section 15. The mistaken pedal operation determination section 16 determines whether or not the mistaken pedal operation has occurred. When it is determined that the mistaken pedal operation has occurred, the intention determination condition switching section 15 switches the CASOIC condition to a condition that is more appropriate for the case where the mistaken pedal operation has occurred.

<Mistaken Pedal Operation Determination Section>

The mistaken pedal operation determination section 16 is configured to determine whether or not a mistaken pedal operation determination condition is satisfied, and determines/infers that the driver's mistaken pedal operation has occurred when the mistaken pedal operation determination condition is (determined to be) satisfied. The determination section 16 determines that the mistaken pedal operation determination condition is satisfied, when all of determination conditions E1-E3 described below are satisfied. Hereinafter, a mistaken pedal operation determination result that indicates that it has been determined that the mistaken pedal operation has occurred is expressed as "mistaken pedal operation determination: ON". Whereas, the mistaken pedal operation determination result that indicates that it has not been determined that the mistaken pedal operation has occurred is expressed as "mistaken pedal operation determination: OFF".

Condition E1: To be satisfied when the present time point is within a predetermined threshold time (time length, e.g., 0.5 second) from a time point at which (a result of) an acceleration pedal operation rate determination (acceleration operation rate determination) turns to be (becomes) "ON". The acceleration pedal operation rate determination will be described later.

Condition E2: To be satisfied when a value of an automatic brake execution determination flag F is "0".

Condition E3: To be satisfied when the acceleration pedal operation amount AP is equal to or greater than a threshold APa (i.e., AP APa). The threshold APa has been set at a value larger than a threshold APb described later.

The acceleration pedal operation rate determination (or a result of the acceleration pedal operation rate determination) used in the condition E1 above is set to "ON" when all of the following operation rate determination conditions E1-1, E1-2, E1-3, and E1-4 are satisfied. In other words, the acceleration pedal operation rate determination remains "OFF" when at least one of the conditions E1-1, E1-2, E1-3, and E1-4 is not satisfied.

Condition E1-1: To be satisfied when the acceleration pedal operation amount AP is equal to or greater than the threshold APb (i.e., AP APb).

Condition E1-2: To be satisfied when an acceleration pedal operation rate APV is equal to or greater than a threshold APVc (i.e., APV≥APVc).

Condition E1-3: To be satisfied when a duration time Tboff that is a time length of a case where the brake switch continues being off is equal to or greater/longer than a threshold Tx (i.e., Tboff≥Tx).

Condition E1-4: To be satisfied when a duration time Twoff that is a time length of a case where the turn signal lamps continue being off is equal to or greater/longer than a threshold Ty (i.e., Twoff≥Ty).

The acceleration pedal operation amount AP means the operation amount of the acceleration pedal and is detected by the acceleration operation amount sensor. The acceleration pedal operation rate (or the change rate in the acceleration pedal operation amount) APV is an increasing/changing amount of the acceleration pedal operation amount AP per unit time.

The threshold APb is a threshold of the acceleration pedal operation amount for determining an occurrence of the mistaken pedal operation, and the threshold APVc is a threshold of the acceleration pedal operation rate for determining an occurrence of the mistaken pedal operation. Those thresholds have been set at values that are appropriate to detect the rapid/strong operation to the acceleration pedal.

Therefore, the rapid/strong operation of the acceleration pedal by the driver can be detected based on the conditions E1-1 and E1-2.

The conditions E1-3 is provided to determine whether or not the duration time Tboff of the state in which the driver has not operated the brake pedal since he/she operated the brake pedal last time is equal to or greater/longer than a lower limit that is the threshold Tx. For instance, if the driver does not operate the brake pedal for a long time period, there is a relatively high possibility that he/she does not correctly/properly distinguish between a position of the acceleration pedal and a position of the brake pedal. Therefore, it is more likely that the mistaken pedal operation has occurred (has been performed) when the conditions E1-1 and E1-2 become satisfied in a case where the driver has not operated the brake pedal for a long time period. This is the reason why the condition E1-3 is employed.

The conditions E1-4 is provided to determine whether or not the duration time Twoff of the state in which the turn signal lamps have not been activated is equal to or greater/longer than a lower limit that is the threshold Ty. For instance, in a period immediately after a time point (turn signal off time point) at which any of the right turn signal lamps and the left turn signal lamps, which have been activated (intermittently lighted), are turned off, there is a high possibility that the host vehicle is in the process of passing a preceding vehicle, or there is a high possibility that the host vehicle is running in a curved road. In these circumstances, the driver often operates/presses the acceleration pedal strongly/rapidly. Whereas, when the conditions E1-1 and E1-2 become satisfied after a relatively long time has passed since the turn signal off time point, it is more likely that the mistaken pedal operation has occurred (has been performed). This is the reason why the condition E1-4 is employed.

The condition E2 is a condition to be satisfied when the automatic brake control is not being executed by the automatic brake control section 13. The automatic brake control section 13 outputs the value of the automatic brake execution determination flag F that is indicative of whether or not it is performing the automatic brake control. The automatic brake execution determination flag F indicates that the automatic brake control is not being executed when the value of the flag F is "0". The automatic brake execution determination flag F indicates that the automatic brake control is being executed when the value of the flag F is "1". The mistaken pedal operation determination section 16 determines whether or not the automatic brake control is being executed based on (by reading/referring to) the value of the automatic brake execution determination flag F.

The condition E3 (together with the condition E1) is a condition to determine whether or not the acceleration pedal operation amount AP has reached (further increased to be) a value equal to or greater than the threshold APa within a predetermined time from a time point at which the acceleration pedal operation rate determination (result) turned to be "ON". When the driver has performed the mistaken pedal operation, the acceleration pedal operation amount AP continues increasing even after the acceleration pedal operation rate APV reached the value equal to or greater than the threshold APVc (i.e., after the condition E1-2 became satisfied). The reason for this is that the driver is likely to be in panic mode and to press strongly/rapidly the acceleration pedal. This is why the condition E3 is employed to determine whether or not the acceleration pedal operation amount AP is equal to or greater than the threshold APa that has been set to the value larger than the threshold APb.

The mistaken pedal operation determination section 16 holds its determination result indicative of the occurrence of the mistaken pedal operation once the mistaken pedal operation determination section 16 determines that the mistaken pedal operation has occurred, until it is detected that the acceleration pedal is released or returned (i.e., until a returning operation of the acceleration pedal, or a returning acceleration operation is detected). For example, the mistaken pedal operation determination section 16 returns the mistaken pedal operation determination result to the "mistaken pedal operation determination: OFF" when the mistaken pedal operation determination section 16 detects that the acceleration pedal operation amount AP has decreased to a value equal to or smaller than a returning acceleration operation determining threshold APend (e.g., 10% of fully opened amount of the acceleration pedal operation amount).

<Mistaken Pedal Operation Determination Routine>

Figure 3:
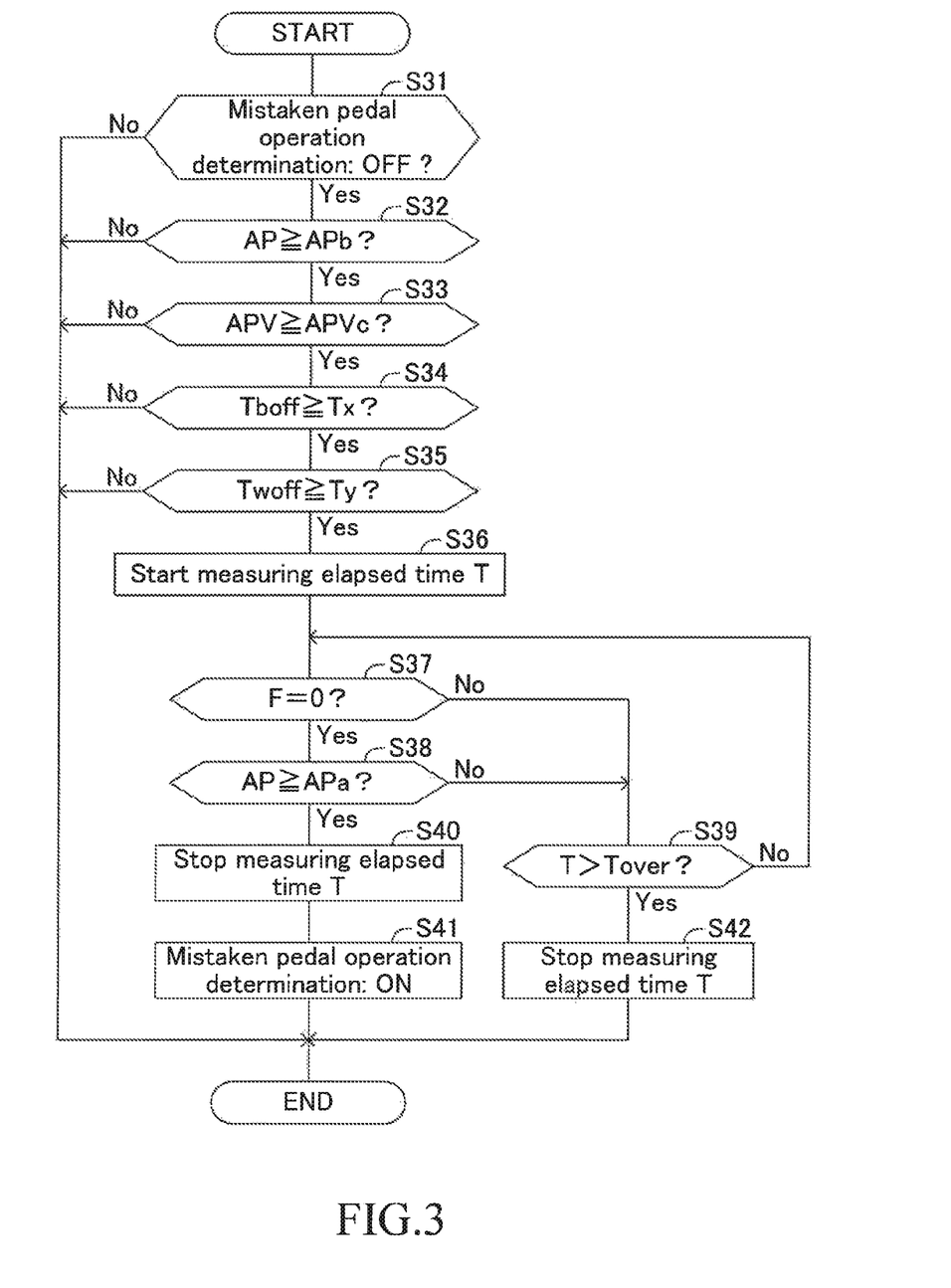
FIG. 3 is a flowchart representing a mistaken pedal operation determination routine.

FIG. 3 illustrates a flowchart describing a mistaken pedal operation determination routine that specifically shows processes carried out by the above described mistaken pedal operation determination section 16. The mistaken pedal operation determination section 16 executes the mistaken pedal operation determination routine every time a predetermined time elapses.

At step S31, the determination section 16 determines whether or not the mistaken pedal operation determination result is "the mistaken pedal operation determination: OFF", and executes processes of step S32 and following steps when the mistaken pedal operation determination result is "the mistaken pedal operation determination: OFF". The mistaken pedal operation determination result is initially set at "the mistaken pedal operation determination: OFF".

The determination section 16 determines whether or not the above described conditions E1-1, E1-2, E1-3, and E1-4 are satisfied through steps S32-S35, respectively. Namely, the process of step S32 is for determining whether or not the condition E1-1 is satisfied. The process of step S33 is for determining whether or not the condition E1-2 is satisfied. The process of step S34 is for determining whether or not the condition E1-3 is satisfied. The process of step S35 is for determining whether or not the condition E1-4 is satisfied.

The determination section 16 ends the mistaken pedal operation determination routine tentatively, when at least one of conditions E1-1, E1-2, E1-3, and E1-4 is not satisfied. When all of the conditions E1-1, E1-2, E1-3, and E1-4 are satisfied, the determination section 16 proceeds to step S36 so as to start measuring an elapsed time T using a timer.

Subsequently, at step S37, the determination section 16 determines whether or not the value of the automatic brake execution determination flag F is "0" (refer to the condition E2). When the automatic brake execution determination flag F is "0", the determination section 16 determines whether or not the acceleration pedal operation amount AP is equal to or greater than the threshold APa (refer to the condition E3) at step S38.

When at least one of the determination results at step S37 and step S38 is "No", the determination section 16 proceeds to step S39 so as to determine whether or not the elapsed time T measured by the timer is greater than a predetermined set time Tover (e.g., 0.5 second). As long as the elapsed time T is equal to or smaller than the predetermined set time Tover, the determination section 16 returns to step S37, and repeats the processes of step S37 to S39.

If both of the condition E2 and the condition E3 become satisfied (S37: Yes, S38: Yes) before the elapsed time T reaches the set time Tover, the determination section 16 stops measuring the elapsed time T at step S40. Thereafter, the determination section 16 sets the mistaken pedal operation determination result to "the mistaken pedal operation determination: ON" at step S41, and thereafter, ends the mistaken pedal operation determination routine.

In contrast, when the elapsed time T becomes greater than the set time Tover before both of the condition E2 and the condition E3 become satisfied (S39: Yes), the determination section 16 stops measuring the elapsed time T at step S42, and thereafter, ends the mistaken pedal operation determination routine.

<Mistaken Pedal Operation Determination (Result) Canceling Routine>

Figure 4:
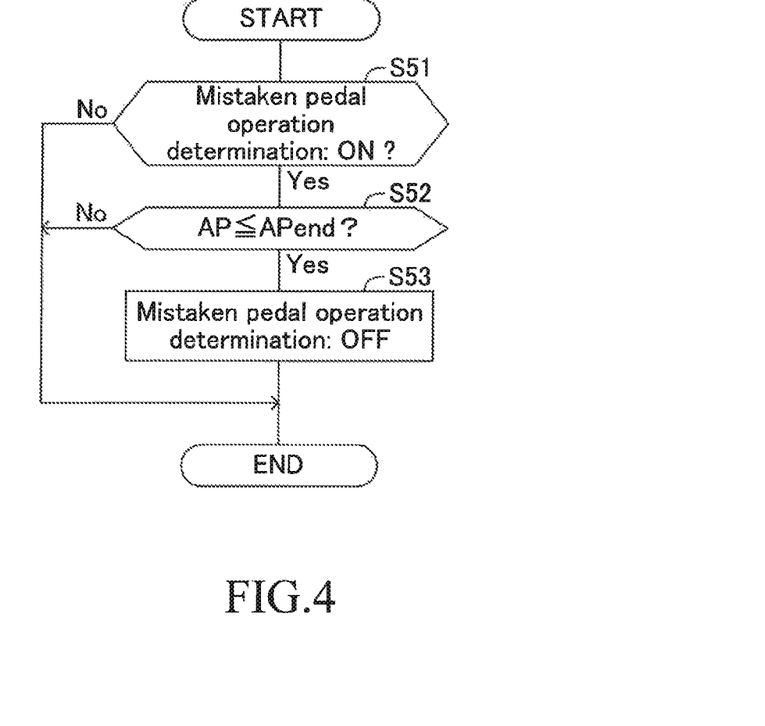
FIG. 4 is a flowchart representing a mistaken pedal operation determination canceling routine.

The determination section 16 executes a mistaken pedal operation determination canceling routine shown in FIG. 4 so as to execute processes for returning the mistaken pedal operation determination result to "the mistaken pedal operation determination: OFF" from "the mistaken pedal operation determination: ON". The mistaken pedal operation determination canceling routine is executed every time the predetermined time elapses in parallel with the mistaken pedal operation determination routine shown in FIG. 3.

After the determination section 16 has started the mistaken pedal operation determination canceling routine, the determination section 16 determines whether or not the mistaken pedal operation determination result is "the mistaken pedal operation determination: ON" at step S51. If the mistaken pedal operation determination result is "the mistaken pedal operation determination: OFF", the determination section 16 ends the mistaken pedal operation determination canceling routine tentatively. Whereas, if the mistaken pedal operation determination result is "the mistaken pedal operation determination: ON", the determination section 16 determines whether or not a mistaken pedal operation determination end condition becomes satisfied at step 25. In this example, the determination section 16 determines whether or not the acceleration pedal operation amount AP has decreased to the value equal to or smaller than the returning acceleration operation determining threshold APend (e.g., 10% of the fully opened amount of the acceleration pedal operation amount). If the acceleration pedal operation amount AP has not decreased to the value equal to or smaller than the returning acceleration operation determining threshold APend, the determination section 16 ends the mistaken pedal operation determination canceling routine tentatively. When the determination section 16 determines that the acceleration pedal operation amount AP has decreased to the value equal to or smaller than the returning acceleration operation determining threshold APend (S52: Yes), the determination section 16 returns the mistaken pedal operation determination result to "the mistaken pedal operation determination: OFF", and thereafter, ends the mistaken pedal operation determination canceling routine.

<Intention Determination Condition Switching Section>

The intention determination condition switching section 15 switches conditions as the CASOIC condition between when the mistaken pedal operation determination result is the "mistaken pedal operation determination: ON" (i.e., at a normal state) and when the mistaken pedal operation determination result is the "mistaken pedal operation determination: OFF". In other words, the CASOIC condition used by the delay control section 14 when the mistaken pedal operation determination result is the "mistaken pedal operation determination: ON" is different from the CASOIC condition used by the delay control section 14 when the mistaken pedal operation determination result is the "mistaken pedal operation determination: OFF".

More specifically, the CASOIC condition is changed, based on the mistaken pedal operation determination result, by changing the value of the steering angle threshold $\theta$ref and the value of the steering operation rate threshold $\omega$ref. Namely, the intention determination condition switching section 15 sets the value of the steering angle threshold $\theta$ref to a normal steering angle threshold $\theta$ref1 ($\theta$ref$\leftarrow$$\theta$ref1) when the mistaken pedal operation determination result is the "mistaken pedal operation determination: OFF", and sets the value of the steering angle threshold $\theta$ref to a mistaken pedal operation steering angle threshold $\theta$ref2 ($\theta$ref$\leftarrow$$\theta$ref2) when the mistaken pedal operation determination result is the "mistaken pedal operation determination: ON". The mistaken pedal operation steering angle threshold $\theta$ref2 has been set at a value greater than the normal steering angle threshold $\theta$ref1.

The intention determination condition switching section 15 sets the value of the steering operation rate threshold $\omega$ref to a normal steering operation rate threshold $\omega$ref1 ($\omega$ref$\leftarrow$$\omega$ref1) when the mistaken pedal operation determination result is the "mistaken pedal operation determination: OFF", and sets the value of the steering operation rate threshold $\omega$ref to a mistaken pedal operation steering operation rate threshold $\omega$ref2 ($\omega$ref$\leftarrow$$\omega$ref2) when the mistaken pedal operation determination result is the "mistaken pedal operation determination: ON". The mistaken pedal operation steering operation rate threshold $\omega$ref2 has been set at a value greater than the normal steering operation rate threshold $\omega$ref1.

Accordingly, the CASOIC condition of when the mistaken pedal operation determination result is the "mistaken pedal operation determination: ON" is harder to be satisfied than the CASOIC condition of when the mistaken pedal operation determination result is the "mistaken pedal operation determination: OFF". In other words, in order for the CASOIC condition to be satisfied, the quicker driver's steering operation and/or the greater driver's steering operation are required when the mistaken pedal operation determination result is the "mistaken pedal operation determination: ON" (as compared to when the mistaken pedal operation determination result is the "mistaken pedal operation determination: OFF").

The delay control section 14 determines whether or not the CASOIC condition is satisfied, using the thresholds (the steering angle threshold $\theta$ref and the steering operation rate threshold $\omega$ref) changed/set by the intention determination condition switching section 15. The delay control section 14 determines/infers that the collision avoidance steering operation of the driver has performed when CASOIC condition is (determined to be) satisfied.

<PCS Control Routine>

Figure 2:
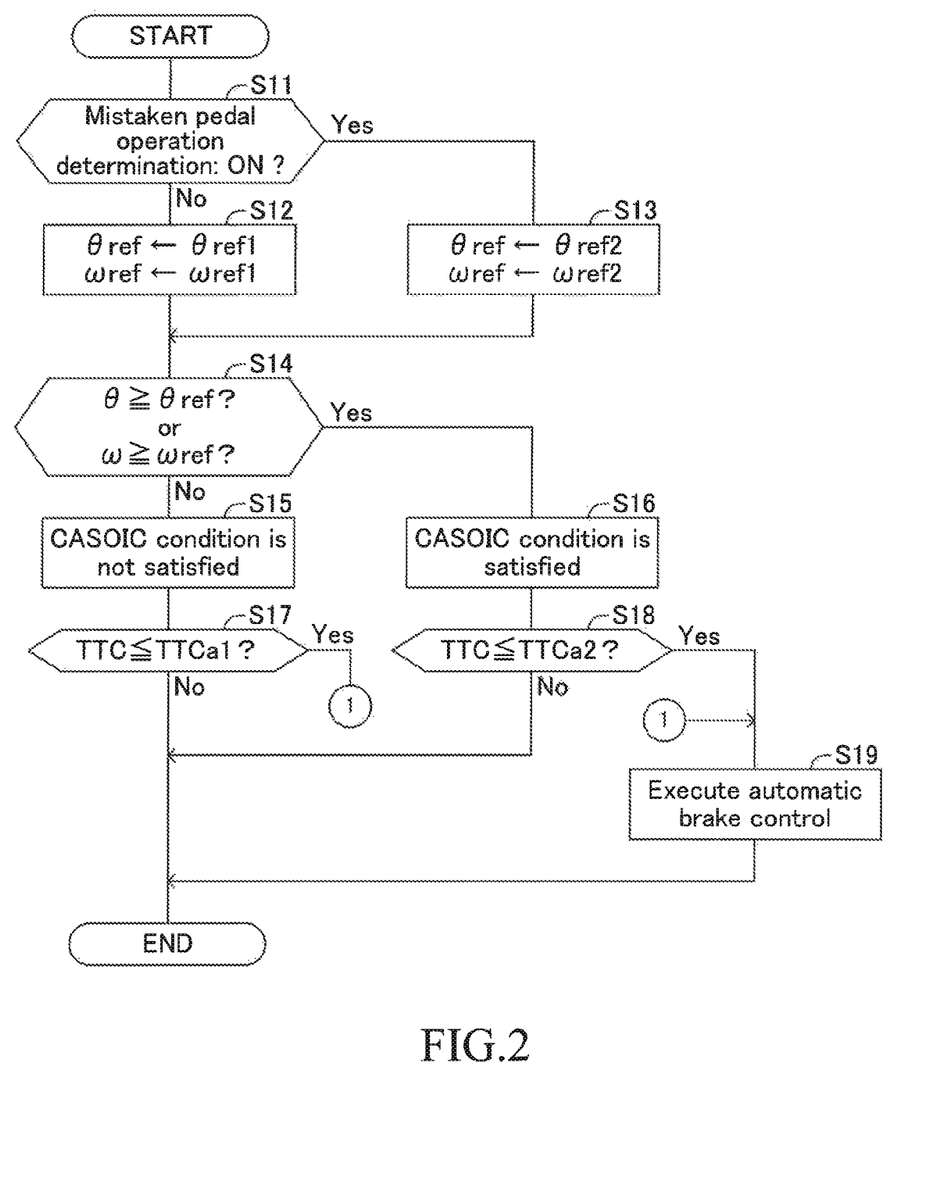
FIG. 2 is a flowchart representing a PCS control routine.

Specific processes executed by the driving assist ECU 10 will next be described. FIG. 2 shows a PCS control routine executed by the driving assist ECU 10 (i.e., by the functional sections 11, 13-16 described above). It should be noted that a notification control executed by the notification section 12 is not included in the PCS control routine described below.

When the driving assist ECU 10 detects the obstacle present ahead of the host vehicle, it starts the PCS control routine.

At step S11, the driving assist ECU 10 determines whether or not the mistaken pedal operation determination result obtained by the mistaken pedal operation determination section 16 is the "mistaken pedal operation determination: ON". When the mistaken pedal operation determination result is the "mistaken pedal operation determination: OFF", the driving assist ECU 10 proceeds to step S12 so as to set the value of the steering angle threshold $\theta$ref to the normal steering angle threshold $\theta$ref1 ($\theta$ref←$\theta$ref1) and set the value of the steering operation rate threshold $\omega$ref to the normal steering operation rate threshold $\omega$ref1 ($\omega$ref←$\omega$ref1).

Whereas, when the mistaken pedal operation determination result is the "mistaken pedal operation determination: ON", the driving assist ECU 10 proceeds to step S13 so as to set the value of the steering angle threshold $\theta$ref to the mistaken pedal operation steering angle threshold $\theta$ref2 ($\theta$ref←$\theta$ref2) and set the value of the steering operation rate threshold $\omega$ref to the mistaken pedal operation steering operation rate threshold $\omega$ref2 ($\omega$ref←$\omega$ref2).

After the driving assist ECU 10 sets the value of the steering angle threshold $\theta$ref and the value of the steering operation rate threshold $\omega$ref either at step S12 or step S13, the driving assist ECU 10 proceeds to step S14. At step S14, the driving assist ECU 10 determines whether or not the steering angle $\theta$ is equal to or greater than the steering angle threshold $\theta$ref (i.e., $\theta \geq \theta$ref). In addition, at step S14, the driving assist ECU 10 determines whether or not the steering operation rate $\omega$ is equal to or greater than the steering operation rate threshold $\omega$ref (i.e., $\omega \geq \omega$ref).

If the driving assist ECU 10 makes a "No" determination at step S14 (namely, when the steering angle $\theta$ is smaller than the steering angle threshold $\theta$ref (i.e., $\theta < \theta$ref) and the steering operation rate $\omega$ is smaller than the steering operation rate threshold $\omega$ref (i.e., $\omega < \omega$ref)), the driving assist ECU 10 proceeds to step S15. At step S15, the driving assist ECU 10 determines that the collision avoidance steering operation intention confirmation condition (CASOIC condition) is not satisfied.

In contrast, if the driving assist ECU 10 makes a "Yes" determination at step S14 (namely, when the steering angle $\theta$ is equal to or greater than the steering angle threshold $\theta$ref (i.e., $\theta \geq \theta$ref) and/or the steering operation rate $\omega$ is equal to or greater than the steering operation rate threshold $\omega$ref (i.e., $\omega \geq \omega$ref)), the driving assist ECU 10 proceeds to step S16. At step S16, the driving assist ECU 10 determines that the collision avoidance steering operation intention confirmation condition (CASOIC condition) is satisfied.

When the driving assist ECU 10 determines that the CASOIC condition is not satisfied, it proceeds to step S17 so as to determine whether or not the time to collision TTC is equal to or smaller/shorter than the normal execution threshold TTCa1.

Whereas, when the driving assist ECU 10 determines that the CASOIC condition is satisfied, it proceeds to step S18 so as to determine whether or not the time to collision TTC is equal to or smaller/shorter than the delaying execution threshold TTCa2 (that is smaller than the normal execution threshold TTCa1).

When the driving assist ECU 10 determines that the time to collision TTC is greater than the normal execution threshold TTCa1 (i.e., TTC>TTCa1) at step S17, or when the driving assist ECU 10 determines that the time to collision TTC is greater than the delaying execution threshold TTCa2 (i.e., TTC>TTCa2) at step S18, it ends the PCS control routine tentatively. In this case, the automatic brake control is not executed. The driving assist ECU 10 repeats the PCS control routine at a short interval (calculation cycle).

While those processes are repeated, the driving assist ECU 10 proceeds to step S19, when it is determined that the time to collision TTC is equal to or smaller/shorter than the normal execution threshold TTCa1 (i.e., TTC≤TTCa1) or when it is determined that the time to collision TTC is equal to or smaller/shorter than the delaying execution threshold TTCa2 (i.e., TTC≤TTCa2). At step S19, the driving assist ECU 10 starts the automatic brake control. Consequently, the frictional brake force are generated and applied to each of the wheels so as to decelerate the host vehicle, and therefore, the collision with the obstacle is avoided.

After the driving assist ECU 10 starts the automatic brake control, it continues executing the automatic brake control without restarting the above described PCS control routine, until:

when it is determined that the collision between the host vehicle and the obstacle is avoided (i.e., when the time to collision TTC becomes greater than the end threshold TTCb); or when it is determined that the host vehicle stops owing to the automatic brake control.

After the driving assist ECU 10 ends the automatic brake control, it restart the PCS control routine when a new obstacle is detected.

As has been described, according to the collision avoidance assist control apparatus of the embodiment, the value of the steering angle threshold $\theta$ref and the value of the steering operation rate threshold $\omega$ref of when it is determined that the mistaken pedal operation has occurred are set to the respective values that are greater than the ones of when it is not determined that the mistaken pedal operation has occurred. The accuracy of the determination/inference as to whether or not the collision avoidance steering operation of the driver has performed is higher, as the steering angle $\theta$ is larger, and/or as the steering operation rate $\omega$ is larger. Therefore, the collision avoidance assist control apparatus of the embodiment can set the collision avoidance steering operation intention confirmation condition (CASOIC condition, the condition W1 or the condition W2) appropriately even when it is determined that the mistaken pedal operation has occurred. Therefore, the collision avoidance steering operation intention determination can be made appropriately, so that the start timing of the automatic brake control is not delayed unnecessarily.

In addition, according to the collision avoidance assist control apparatus of the embodiment, the value of the execution threshold (the delaying execution threshold TTCa2) for delaying the start timing of the automatic brake control is smaller/shorter than the value of the execution threshold (the normal execution threshold TTCa1) for not delaying the start timing of the automatic brake control. Therefore, the start timing of the automatic brake control is easily and certainly delayed.

The collision avoidance assist control apparatus according to the embodiment of the present disclosure has been described. The present disclosure of the collision avoidance assist control apparatus should not be limited to the embodiment, and can adopt various modifications without departing from the present disclosure.

For example, in the above embodiment, the determining condition W1 and the determining condition W2 are used as the CASOIC condition (i.e., the collision avoidance steering operation intention confirmation condition), and it is determined that the collision avoidance steering operation of the driver has been performed when at least one the conditions W1 and W2 is satisfied, however, the CASOIC condition is not limited to the above conditions. For instance, the CASOIC condition may include the determining condition W1 only, or may include the determining condition W2 only.

For example, the conditions E1 to E3 are used to determine whether or not the mistaken pedal operation has occurred in the embodiment, however, different conditions may be used to determine whether or not the mistaken pedal operation has occurred. For instance, the mistaken pedal operation determination section may be configured to determine that the mistaken pedal operation has occurred at least two of the conditions are satisfied, one being the condition to be satisfied when the acceleration pedal operation amount AP is equal to or larger than the threshold APb (AP≥APb). and the other being the condition to be satisfied when the acceleration pedal operation rate APV is equal to or larger than a threshold APVc (APV≥APVc).

For instance, the condition E1 may be a condition to be satisfied when only the condition (acceleration pedal operation rate determination condition) E1-2 is satisfied, regardless of the conditions E1-1, E1-3, and E1-4. Furthermore, the condition E1 may be a condition to be satisfied as long as the both of the conditions (acceleration pedal operation rate determination conditions) E1-2 and E1-1 are satisfied.

What is claimed is:

1. A collision avoidance assist control apparatus comprising:
   a brake device configured to generate brake force applied to a host vehicle in accordance with a brake pedal operation of a driver;
   a surrounding area detection sensor configured to obtain information on an object that is present around said host vehicle; and
   a control unit configured to:
     regard said object as an obstacle when said object is determined to have a certain probability of an imminent collision between said host vehicle and said object based on said information obtained by said surrounding area detection sensor; and
     perform an automatic brake control to let said brake device generate said brake force applied to said host vehicle without requiring said brake pedal operation of said driver so as to avoid said collision, when said object is regarded as said obstacle,
   wherein,
   said control unit is configured to:
     determine whether or not a steering operation index value correlated with a steering operation of said driver satisfies a predetermined collision avoidance steering operation intention confirmation condition that is a condition to be satisfied when it can be inferred that said driver has performed a steering operation to avoid said imminent collision between said host vehicle and said obstacle;
     delay a start timing of said automatic brake control when it is determined that said steering operation index value correlated satisfies said collision avoidance steering operation intention confirmation condition;
     determine whether or not an acceleration operation index value correlated with an acceleration pedal operation of said driver satisfies a predetermined mistaken pedal operation determination condition that is a condition to be satisfied when it can be inferred that said driver has performed a mistaken pedal operation to mistakenly press an acceleration pedal despite an intention of said driver to operate a brake pedal; and
     use a first specific condition, as said collision avoidance steering operation intention confirmation condition, when said acceleration operation index value has satisfied said mistaken pedal operation determination condition, and use a second specific condition, as said collision avoidance steering operation intention confirmation condition, when said acceleration operation index value has not satisfied said mistaken pedal operation determination condition, wherein said first specific condition is harder to be satisfied by said steering operation index value than said second specific condition, wherein, said control unit is configured to: obtain a steering angle as said steering operation index value; and determine that said steering operation index value has satisfied said first specific condition in at least a case where said steering angle is equal to or greater than a first steering angle threshold that is greater than a second steering angle threshold; and determine that said steering operation index value has satisfied said second specific condition in at least a case where said steering angle is equal to or greater than said second steering angle threshold.

2. The collision avoidance assist control apparatus according to claim 1, wherein,
   said control unit is configured to:
     obtain a steering operation rate as said steering operation index value; and
     determine that said steering operation index value has satisfied said first specific condition in at least a case where said steering operation rate is equal to or greater than a first steering operation rate threshold that is greater than a second steering operation rate threshold; and
     determine that said steering operation index value has satisfied said second specific condition in at least a case where said steering operation rate is equal to or greater than said second steering operation rate threshold.

3. The collision avoidance assist control apparatus according to claim 1, wherein,
   said control unit is configured to:
     obtain each of said steering angle and a steering operation rate, as said steering operation index value; and
     determine that said steering operation index value has satisfied said first specific condition, in a case where said steering angle is equal to or greater than said first steering angle threshold that is greater than said second steering angle threshold and/or in a case where said steering operation rate is equal to or greater than a first steering operation rate threshold that is greater than a second steering operation rate threshold; and
     determine that said steering operation index value has satisfied said second specific condition in a case where said steering angle is equal to or greater than said second steering angle threshold and/or in a case where said steering operation rate is equal to or greater than said second steering operation rate threshold.

4. The collision avoidance assist control apparatus according to claim 1, wherein,
   said control unit is configured to:
     perform said automatic brake control when a time to collision that is a predicted time length from a present time point to a collision time point of said imminent collision between said host vehicle and said obstacle decreases down to a value equal to or smaller than an execution threshold; and
     decrease said execution threshold so as to delay said start timing of said automatic brake control.

* * * * *